United States Patent
Kawashima et al.

(10) Patent No.: US 7,573,260 B2
(45) Date of Patent: Aug. 11, 2009

(54) MAGNETIC ROTOR AND ROTATIONAL ANGLE SENSING APPARATUS HAVING THE SAME

(75) Inventors: Takashi Kawashima, Nagoya (JP); Tetsuya Aoki, Chita-gun (JP)

(73) Assignee: Denso Corporation, Kariya (JP)

( * ) Notice: Subject to any disclaimer, the term of this patent is extended or adjusted under 35 U.S.C. 154(b) by 6 days.

(21) Appl. No.: 11/905,845

(22) Filed: Oct. 4, 2007

(65) Prior Publication Data

US 2008/0094058 A1 Apr. 24, 2008

(30) Foreign Application Priority Data

Oct. 20, 2006 (JP) .............................. 2006-286066

(51) Int. Cl.
*G01B 7/14* (2006.01)
*G01R 33/06* (2006.01)
(52) U.S. Cl. ............................ 324/207.25; 324/207.22; 324/179
(58) Field of Classification Search ............ 324/207.25, 324/207.2, 207.21, 207.23, 252, 173, 174, 324/179, 207.22; 73/514.31, 514.39; 310/261, 310/267, 268
See application file for complete search history.

(56) References Cited

U.S. PATENT DOCUMENTS 6,646,435 B1 * 11/2003 Nakamura et al. ...... 324/207.25

FOREIGN PATENT DOCUMENTS

| JP | 11-332148 | 11/1999 |
| JP | 2006-118356 | 5/2006 |

* cited by examiner

*Primary Examiner*—Reena Aurora
(74) *Attorney, Agent, or Firm*—Nixon & Vanderhye, PC (57) ABSTRACT

In a magnetic rotor, a rotatable shaft is received through a holder. A positioner is made of a magnetic material and is fitted into at least one of an outer peripheral wall of the rotatable shaft and an inner peripheral wall of the holder to position the holder relative to the rotatable shaft in a circumferential direction. An annular magnet is fixed to the holder and surrounds the rotatable shaft. The annular magnet has two magnetic poles of different polarities, which are magnetized in a magnetization direction that coincides with a radial direction of the annular magnet. The positioner is displaced around a rotational axis of the rotatable shaft from the magnetization direction of the annular magnet by about 90 degrees in the circumferential direction.

8 Claims, 8 Drawing Sheets

MAGNETIC ROTOR AND ROTATIONAL ANGLE SENSING APPARATUS HAVING THE SAME

CROSS REFERENCE TO RELATED APPLICATION

This application is based on and incorporates herein by reference Japanese Patent Application No. 2006-286066 filed on Oct. 20, 2006.

BACKGROUND OF THE INVENTION

1. Field of the Invention

The present invention relates to a magnetic rotor and a rotational angle sensing apparatus having the same.

2. Description of Related Art

A previously known rotational angle sensing apparatus includes a magnet and a plurality of magnetic sensing elements. The magnet is installed around a rotatable shaft. The magnetic sensing elements output measurement signals of different sine waveforms, which have different phases, according to a change in a magnetic field of the magnet caused by rotation of the rotatable shaft. In such a previously known rotational angle sensing apparatus, an absolute rotational angle of a sensing subject can be sensed (or determined) based on the measurement signals of the magnetic sensing elements.

Figure 11:
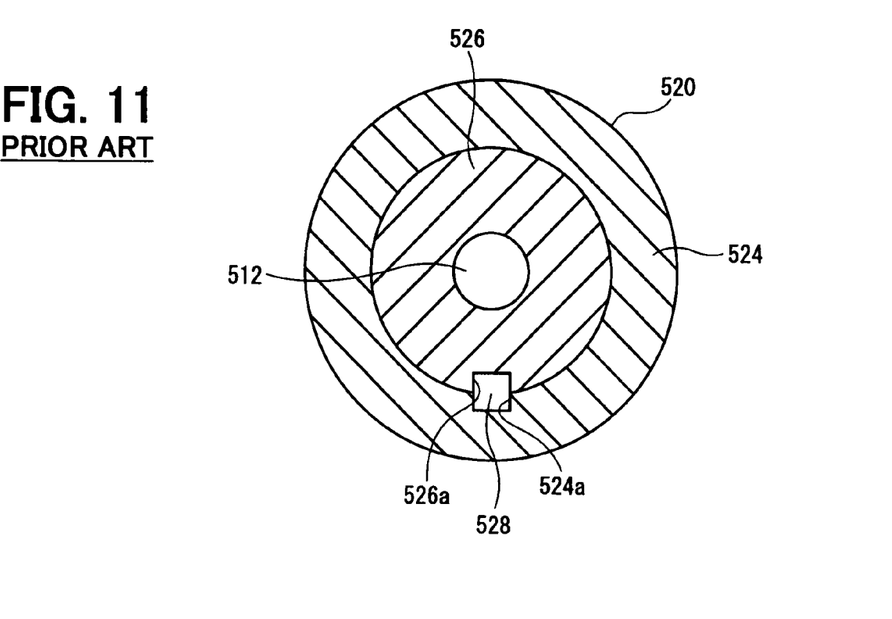
FIG. 11 is a lateral cross sectional view of a prior art rotational angle sensing apparatus.

However, in reality, the waveform of the measurement single of each magnetic sensing element is not a precise sine waveform for the following reason. Specifically, in the rotational angle sensing apparatus, which senses the absolute rotational angle (hereinafter, simply referred as "rotational angle"), it is required to accurately position the magnet relative to the rotatable shaft in the circumferential direction. In view of this requirement, in a magnetic rotor 520, which includes a magnet 524 and a rotatable shaft 512 shown in FIG. 11, a key 528 is fitted into a key groove 524a, which is formed in an inner peripheral wall of the magnet 524, and a key groove 526a, which is formed in an outer peripheral wall of a yoke 526, so that the magnet 524 is positioned relative to the rotatable shaft 512 in the circumferential direction (see, for example, Japanese Unexamined Patent Publication No. H11-332148). Thus, in such a magnetic rotor, a shape of the magnet is not symmetrical about a rotational axis of the rotatable shaft due to the fact that the key groove is formed in the magnet. Thus, the magnetic field of the magnetic rotor is not uniform, so that the waveform of the measurement single of the magnetic sensing element does not become the precise sine waveform. Therefore, the measurement error of the rotational angle sensing apparatus is increased.

SUMMARY OF THE INVENTION

The present invention addresses the above disadvantage. Thus, it is an objective of the present invention to provide a magnetic rotor, which generates a relatively good rotational magnetic field, and also to provide a rotational angle sensing apparatus, which reduces a measurement error.

To achieve the objective of the present invention, there is provided a magnetic rotor, which includes a holder, a positioner and an annular magnet. A rotatable shaft is received through the holder. The positioner is made of a magnetic material and is fitted into at least one of an outer peripheral wall of the rotatable shaft and an inner peripheral wall of the holder to position the holder relative to the rotatable shaft in a circumferential direction. The annular magnet is fixed to the holder and surrounds the rotatable shaft. The annular magnet has two magnetic poles of different polarities, which are magnetized in a magnetization direction that coincides with a radial direction of the annular magnet. The positioner is displaced around a rotational axis of the rotatable shaft from the magnetization direction of the annular magnet by about 90 degrees in the circumferential direction.

To achieve the objective of the present invention, there is also provided a rotational angle sensing apparatus, which includes the above magnetic rotor and a plurality of magnetic sensing elements, which are spaced from the magnetic rotor and output measurement signals of different phases, respectively, in response to a change in a magnetic field of the magnet caused by rotation of the rotatable shaft.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

Various embodiments of the present invention will be described with reference to the accompanying drawings. Here, it should be noted that the same reference numerals will be used to indicate the same or similar components throughout the respective embodiments.

First Embodiment

Figure 1A:
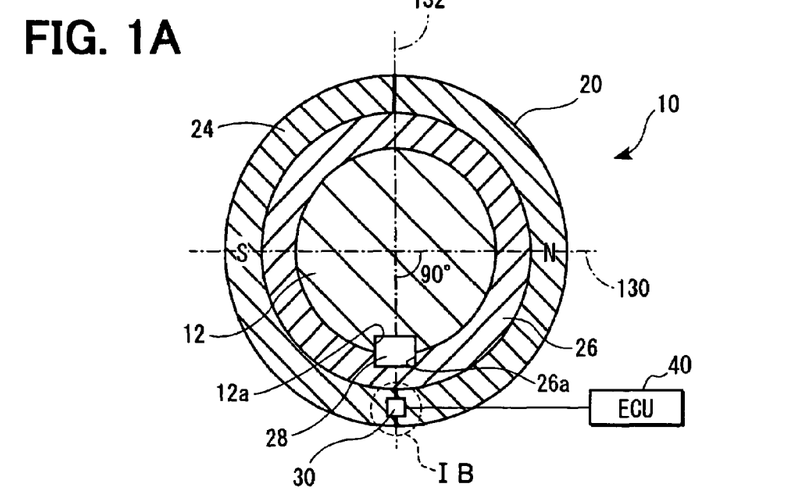
FIG. 1A is a lateral cross sectional view of a rotational angle sensing apparatus according to a first embodiment of the present invention.
Figure 1B:
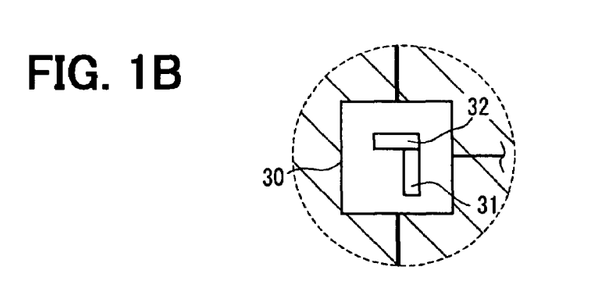
FIG. 1B is an enlarge view of an area IB in FIG. 1A.
Figure 1C:
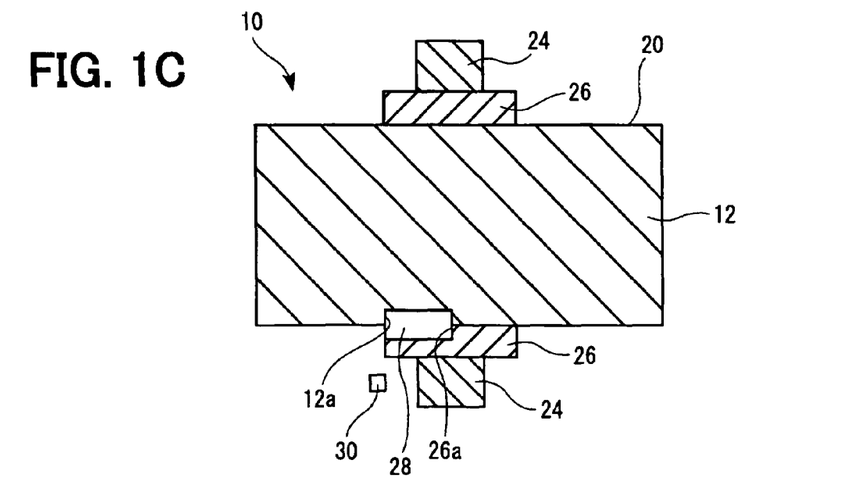
FIG. 1C is a longitudinal cross sectional view of the rotational angle sensing apparatus of FIG. 1A.

With reference to FIGS. 1A to 1C, a rotational angle sensing apparatus 10 according to a first embodiment of the present invention is used to sense a rotational angle of a sensing subject, such as a crankshaft or a vehicle wheel. The rotational angle sensing apparatus 10 includes a rotatable shaft 12, a magnetic rotor 20, a Hall IC 30 and an electronic control unit (ECU) 40.

The rotatable shaft 12 may be a rod-like member, which rotates together with the sensing subject or may be the sensing subject itself (e.g., the crankshaft). A key groove 12a is formed in an outer peripheral wall of the rotatable shaft 12, and a key 28, which serves as a positioner, is fitted into the key groove 12a.

The magnetic rotor 20 includes an annular magnet 24, a collar (serving as a holder) 26 and the key 28.

The annular magnet 24 has two magnetic poles of different polarities, which are opposed to each other in a radial direction of the annular magnet 24. The magnet 24 is fitted to the collar 26. Specifically, the magnet 24 is outsert-molded along with the collar 26 through molding (e.g., injection molding) of a composite material, which includes a magnetic material and a resin material, over the collar 26 to form the magnet 24. The magnet 24 is magnetized to have the two magnetic poles, which are opposed to each other in the radial direction. As discussed above, the magnet 24 and the collar 26 may be formed integrally or may be formed separately. In the latter case where the magnet 24 and the collar 26 are formed separately, the magnet 24 may be installed to the collar 26.

The collar 26 is made of a non-magnetic metal material (e.g., a stainless mesh) and is configured into a cylindrical form. The collar 26 is fitted to the rotatable shaft 12. Specifically, a key groove 26a is formed in an inner peripheral wall of the collar 26, and the key 28 is fitted into the key groove 26a. The key groove 26a is formed in the collar 26 in the above-described manner, so that the magnet 24 can be formed into the annular body. Through use of the annular magnet 24, it is possible to generate a suitable magnetic field that is suitable for generating an output signal of a sine waveform, which corresponds to the rotational angle of the sensing subject, from the Hall IC 30. Furthermore, when the collar 26 is made of the non-magnetic material rather than a magnetic material, it is possible to limit disturbances in the magnetic field of the magnet 24 at the time of magnetizing the magnet 24 after the integration of the collar 26 and the magnet 24. Thus, it is possible to form magnetic poles, which correspond to a specification of the magnetic rotor 20, in the magnet 24.

The key 28 is made of a magnetic material and is fitted into the key groove 12a at the outer peripheral wall of the rotatable shaft 12 and also into the key groove 26a at the inner peripheral wall of the collar 26. In this way, the magnet 24 and the collar 26 are positioned relative to the rotatable shaft 12 in the circumferential direction.

The Hall IC 30 is axially opposed to an axial end surface of the magnet 24 in such a manner that a predetermined distance is kept between the Hall IC 30 and the axial end surface of the magnet 24. The Hall IC 30 is placed at one location in a rotational direction of the magnet 24. The Hall IC 30 is an angle sensor that includes two Hall elements 31, 32, which are integrated in a single-chip semiconductor. The Hall elements 31, 32, which serve as magnetic sensing elements, are arranged such that the Hall elements 31, 32 output measurement signals of different phases, respectively, according to a change in the magnetic field of the magnet 24 caused by rotation of the rotatable shaft 12. For example, the Hall element 31 is placed such that a magnetic sensing surface of the Hall element 31 is perpendicular to the radial direction of the rotatable shaft 12 (hereinafter, referred to as a normal direction). Furthermore, the Hall element 32 is placed such that a magnetic sensing surface of the Hall element 32 is perpendicular to a direction (hereinafter, referred to as a tangent direction) that is angled 90 degrees with respect to the normal direction. That is, the Hall element 31 and the Hall element 32 are displaced from each other by 90 degrees (or about 90 degrees). Furthermore, a constant electric current is supplied to the Hall elements 31, 32.

Figure 2A:
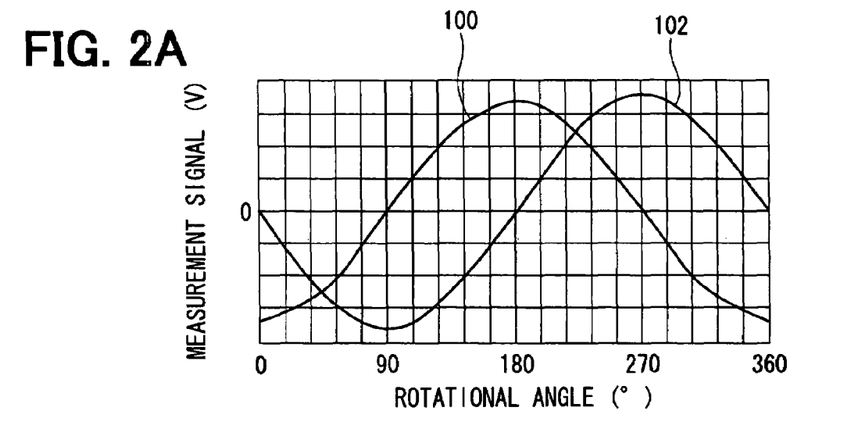
FIG. 2A is a schematic diagram showing a voltage of a measurement signal in view of a rotational angle.

Therefore, as shown in FIG. 2A, when the magnet 24 is rotated together with the sensing subject, each of the Hall elements 31, 32 outputs the corresponding measurement signal 100, 102 of the sign waveform as a corresponding voltage. A phase of the measurement signal 100 differs from a phase of the measurement signal 102. The voltage Va of the measurement signal 100 and the voltage Vb of the measurement signal 102 can be defined by the following equations (1) and (2), respectively. In the following equations (1) and (2), "θ" denotes the rotational angle of the sensing subject, and "k" denotes a coefficient, which is determined by a sensitivity of the corresponding Hall element 31, 32. Furthermore, "B" denotes a magnetic flux density of the magnetic field formed by the magnet 24, and "I" denotes the constant-current.

$$Va = -kBI \cdot \sin\theta \quad \text{Equation (1)}$$

$$Vb = -kBI \cdot \sin(\theta + 90) = -kBI \cdot \cos\theta \quad \text{Equation (2)}$$

The Hall IC 30 outputs the measurement signals of the two Hall elements 31, 32 to the ECU 40. In the rotational angle sensing apparatus 10, the two Hall elements 31, 32 may be formed separately from the ECU 40 as different components or may be formed integrally as a single-chip semiconductor. Furthermore, the two Hall elements 31, 32 may not need to be integrated as the single Hall IC.

The ECU 40 includes a CPU, a ROM and a RAM (not shown). The ECU 40 executes an angle computing program, which is stored in the ROM, to determine the rotational angle of the sensing subject based on the output signals from the Hall IC 30.

Figure 2B:
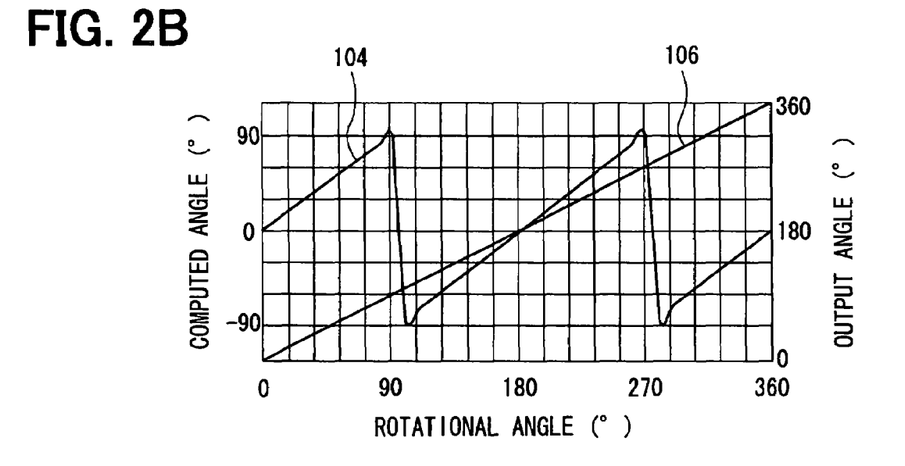
FIG. 2B is a schematic diagram showing a computed angle and an output angle in view of the rotational angle.

Specifically, the ECU 40 determines (or senses) the rotational angle of the sensing subject in a manner described below. That is, the ECU 40 computes "tan θ" based on a ratio between "Va" and "Vb" (see the following equation 3). Next, the ECU 40 obtains a computed angle through arctangent computation (see the following equation 4). As shown in FIG. 2B, one period of the computed angle 104 is 180 degrees.

$$Va/Vb = \sin\theta/\cos\theta = \tan\theta \quad \text{Equation (3)}$$

$$\theta = \arctan(Va/Vb) \quad \text{Equation (4)}$$

Thereafter, the ECU 40 determines a sign (+ or −) of "Va" and of "Vb" to identify the rotational position of the sensing subject in the angular range of 360 degrees. As shown in FIG. 2B, the ECU 40 adds an offset angle to the computed angle 104 based on the identified rotational angular position of the sensing subject to obtain an output angle 106, which indicates the rotational angle of the sensing subject.

However, in reality, the measurement signals of the Hall elements 31, 32 do not show an ideal sine waveform due to the following reason. Specifically, even when the magnet 24 is configured into the annular form, the structure of the magnetic rotor 20 is not symmetrical about the rotational axis of the rotatable shaft 12 due to the presence of the key 28. Now, advantages of the first embodiment will be described with reference to a comparative example.

Comparative Example

Figure 3:
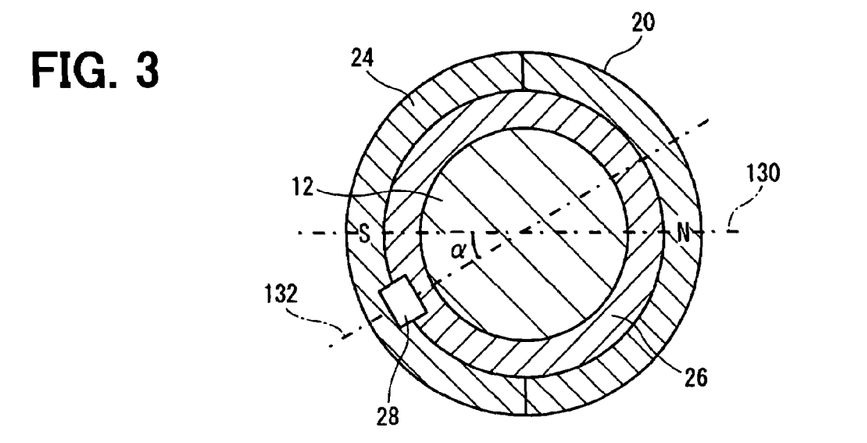
FIG. 3 is a schematic diagram for describing a magnetization angle.
Figure 4A:
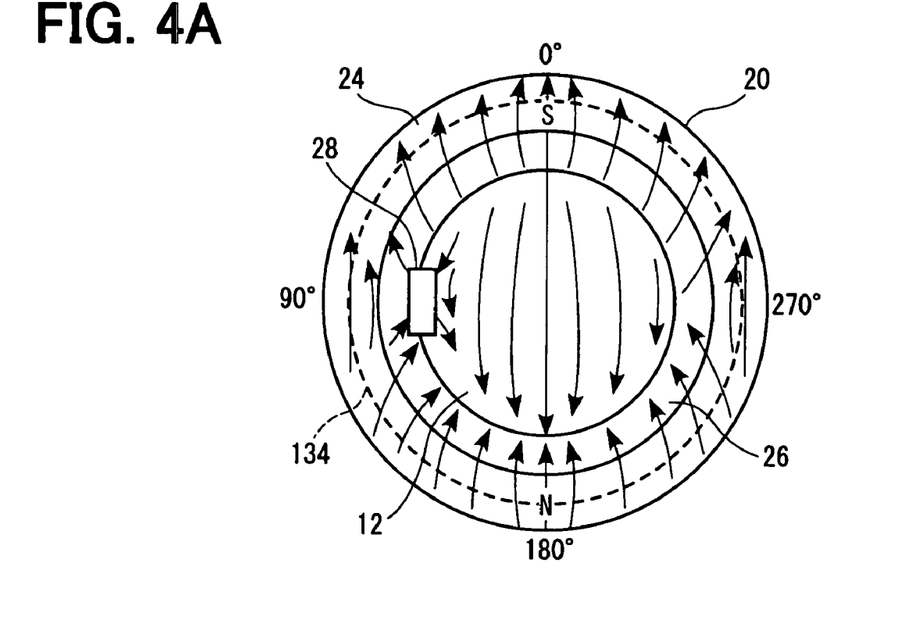
FIG. 4A is a schematic diagram showing a magnetic field of a magnetic rotor according to the first embodiment.
Figure 4B:
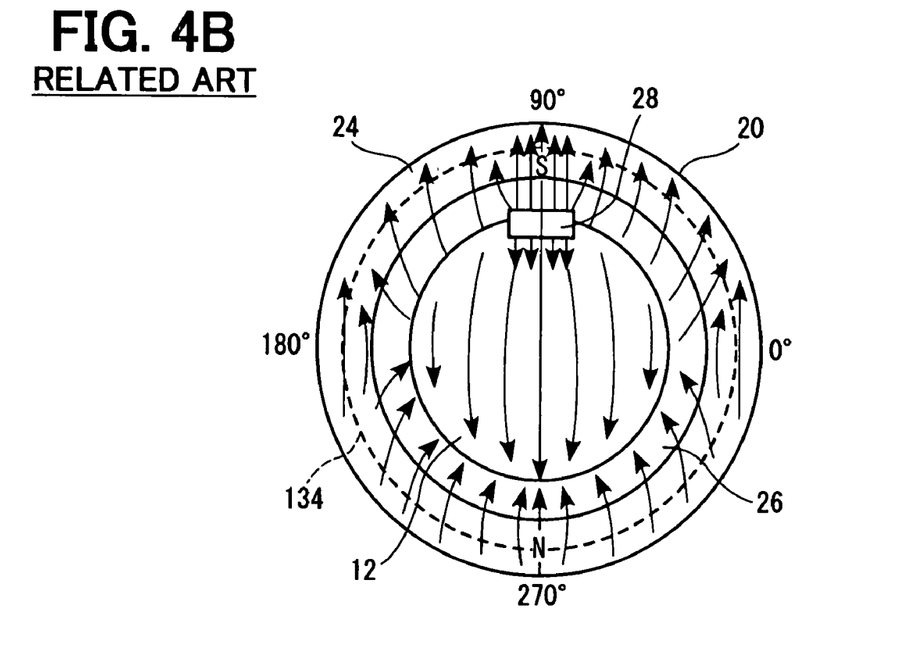
FIG. 4B is a schematic diagram showing a magnetic field of a magnetic rotor of a comparative example.

A comparative rotational angle sensing apparatus in this comparative example is substantially the same as the rotational angle sensing apparatus 10 of the first embodiment except that a magnetization angle of the magnet is set to be 0° (zero degree). With reference to FIG. 3, the magnetization angle is an angle α, which is defined between a straight imaginary line 130, which extends in the magnetization direction of the magnet 24 through the axis of the rotatable shaft 12, and a straight imaginary line 132, which extends through the key 28 across the imaginary line 130 at the rotational axis of the rotatable shaft 12. Here, as shown in FIG. 4B, when the magnetization angle is set to 0°, the key 28, which is made of the magnetic material, is placed in the region where the strength of the magnetic field is relatively high. Therefore, the magnetic lines of force are concentrated on the key 28. When the magnetic field around the magnetic rotor 20 is disturbed, an error occurs in the measurement signals of the Hall elements 31, 32. In FIGS. 4A and 4B, an imaginary circular line 134 indicates a relative moving path of the Hall IC 130 at the time of rotating the magnetic rotor 20. Furthermore, the angular values (0°, 90°, 180°, 270°) indicate the rotational angles of the sensing subject at the time when the key 28 approaches a location that is closes to the Hall IC 30.

Figure 5A:
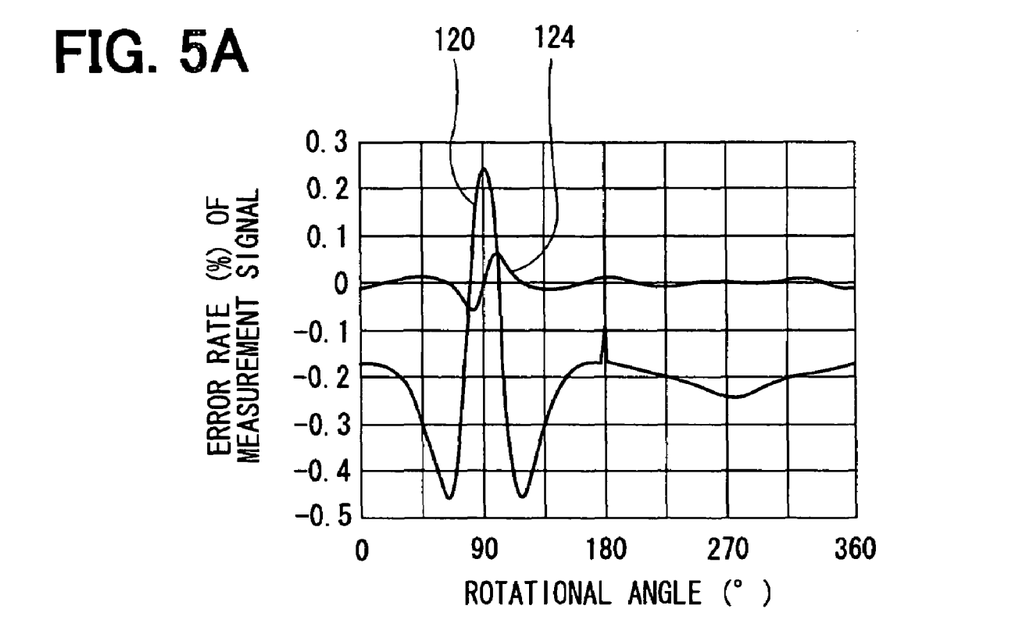
FIG. 5A is a schematic diagram showing an error rate of a measurement signal of one of two Hall elements in view of a rotational angle.
Figure 5B:
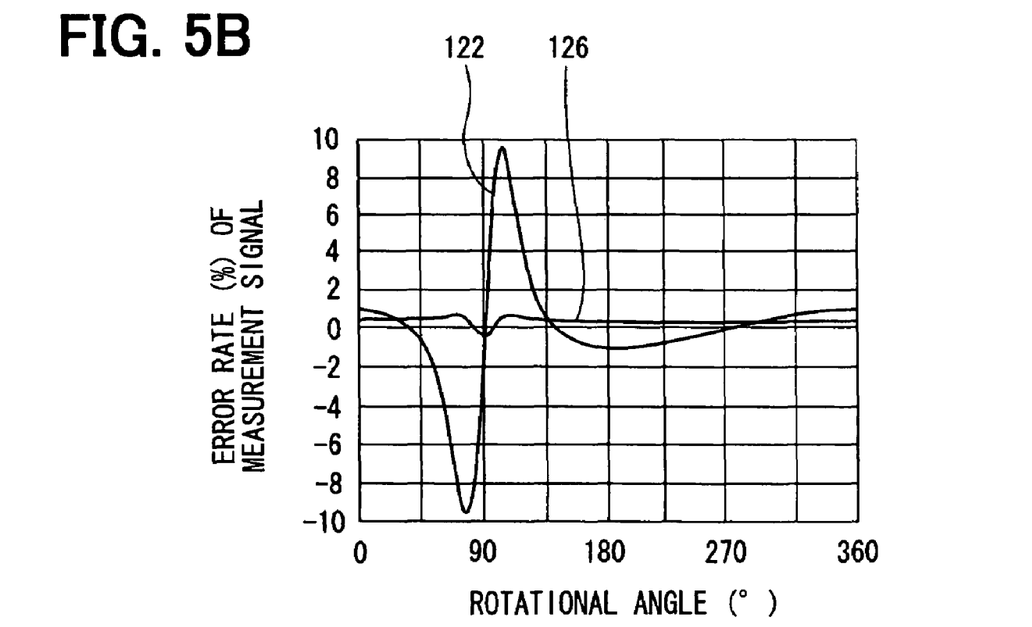
FIG. 5B is a schematic diagram showing an error rate of a measurement signal of the other one of the two Hall elements.

FIGS. 5A and 5B indicate a result of measurement of an error rate of the measurement single at the time of changing the rotational angle of the sensing subject. The error rate of the measurement signal is a value that is obtained by dividing a difference, which is between a size of an actually measured waveform of the measurement signal and a size of an ideal sine waveform of the measurement signal, by a size of a sine waveform. Furthermore, the rotational angle corresponds to the rotational angle shown in FIGS. 4A and 4B. As shown in FIG. 5A, the error rate 120 of the measurement signal of the Hall element 31 reaches +0.25%, −0.45% at or around the rotational angle of 90°. Furthermore, as shown in FIG. 5B, the error rate 122 of the measurement signal of the Hall element 32 reaches ±95% at or around the rotational angle of 90°.

Advantages of First Embodiment

In contrast to the above comparative example, as shown in FIG. 1A, the magnetization angle of the magnet 24 is set to be 90° according to the first embodiment. That is, the key 28 is circumferentially displaced by 90° relative to the magnetization direction of the magnet 24. In such a case, the key 28 is placed in the region where the strength of the magnetic field is relatively low, so that as shown in FIG. 4A, the disturbances caused by the key 28 in the magnetic field around the magnetic rotor 20 are relatively small.

Therefore, the error in the measurement signals of the Hall elements 31, 32 can be reduced. Specifically, as shown in FIG. 5A, the error rate 124 of the measurement signal of the Hall element 31 is ±0.05% at or around the rotational angle of 90°. Furthermore, as shown in FIG. 5B, the error rate 126 of the measurement signal of the Hall element 32 is about ±1% at or around the rotational angle of 90°.

Figure 6A:
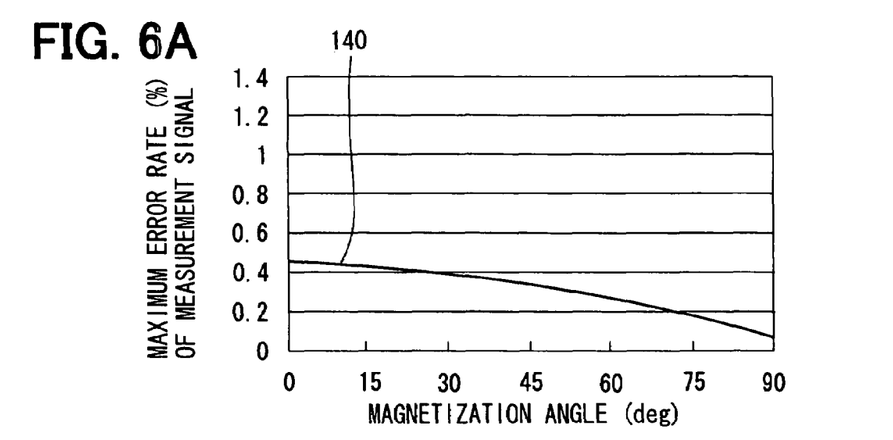
FIG. 6A is a schematic diagram showing a maximum error rate of the measurement signal of the one of the two Hall elements in view of a magnetization angle.
Figure 6B:
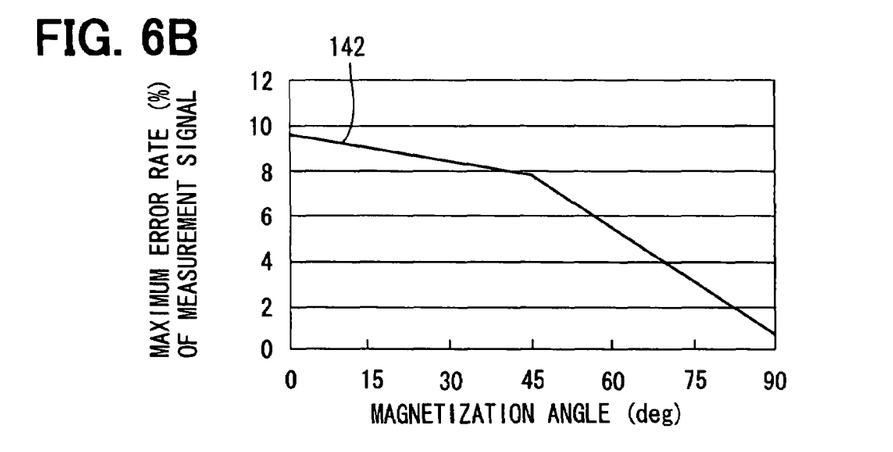
FIG. 6B is a schematic diagram showing a maximum error rate of the measurement signal of the other one of the two Hall elements in view of the magnetization angle.

FIGS. 6A and 6B show a relationship between the magnetization angle of the magnet 24 and a maximum error rate of the measurement signal in the case of the rotational angle sensing apparatus 10. In FIGS. 6A and 6B, the maximum error rate of the measurement signal is the largest error rate among the error rates of the measurement signals at the time of rotating the magnetic rotor 20 through one full rotation. Furthermore, FIG. 6A shows the maximum error rate 140 of the measurement signal of the Hall element 31, and FIG. 6B shows the maximum error rate 142 of the measurement single of the Hall element 32. As clearly shown in FIGS. 6A and 6B, the maximum error rate of the measurement signal becomes smaller when the magnetization angle changes from 0° toward 90°.

Thus, in order to reduce the error rate of the measurement signal, it is desirable to set the magnetization angle of the magnet 24 to 90°. However, it is not absolutely required to precisely set the magnetization angle to 90°. That is, when the magnetization angle is set to 90° or therearound (i.e., about 90°), the error rate of the measurement signal can be reduced in comparison to the case where the magnetization angle is set to 0°.

As discussed above, according to the first embodiment, the magnetization angle of the magnet 24 is set to about 90°, so that the disturbances caused by the key 28 in the magnetic field of the magnetic rotor 20 can be reduced, and thereby the measurement error of the rotational angle sensing apparatus 10 can be reduced.

Second Embodiment

Figure 7:
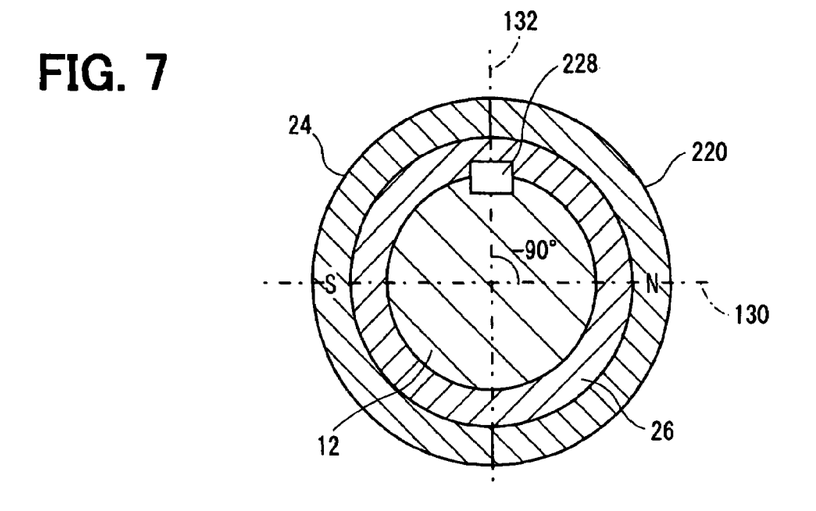
FIG. 7 is a cross sectional view of rotational angle sensing apparatus according to a second embodiment of the present invention.

A rotational angle sensing apparatus according to a second embodiment of the present invention is substantially the same as the rotational angle sensing apparatus 10 of the first embodiment. With reference to FIG. 7, a key 228 of a magnetic rotor 220 according to the second embodiment is substantially the same as the key 28 of the first embodiment. The key 228 is circumferentially displaced by 180° relative to the key 28 of the first embodiment. That is, in the rotational angle sensing apparatus of the second embodiment, the magnetization angle is set to −90° (or about −90°)

Even in such a case, similar to the first embodiment, the disturbances caused by the key 228 in the magnetic field of the magnet rotor 220 can be limited, and thereby the measurement error of the rotational angle sensing apparatus can be reduced.

Third Embodiment

The rotational angle sensing apparatus according to a third embodiment of the present invention is substantially the same as the rotational angle sensing apparatus 10 according to the first embodiment except that the magnetic rotor includes two keys.

Figure 8A:
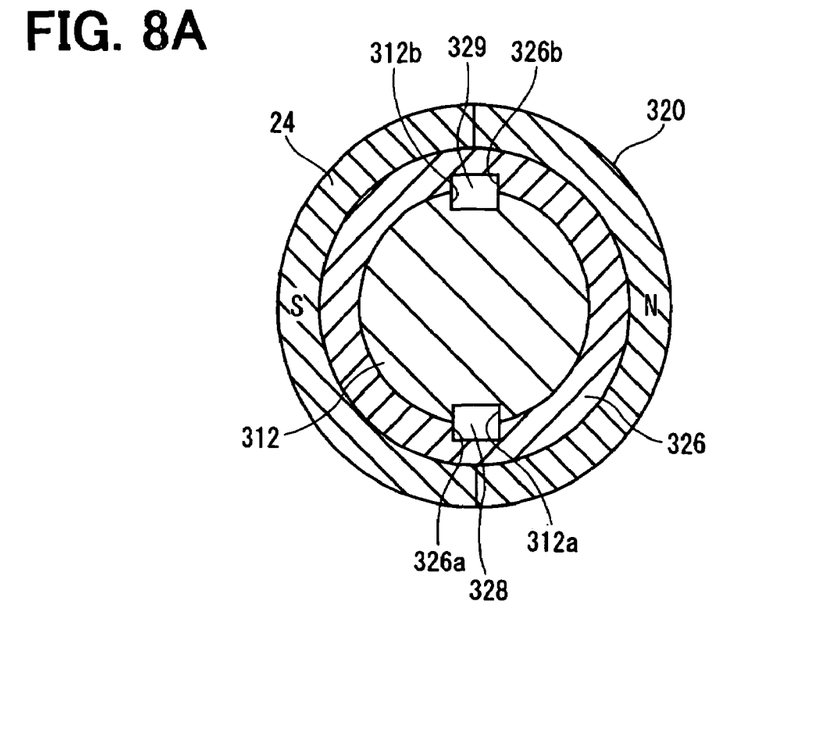
FIG. 8A is a lateral cross sectional view of a rotational angle sensing apparatus according to a third embodiment of the present invention.
Figure 8B:
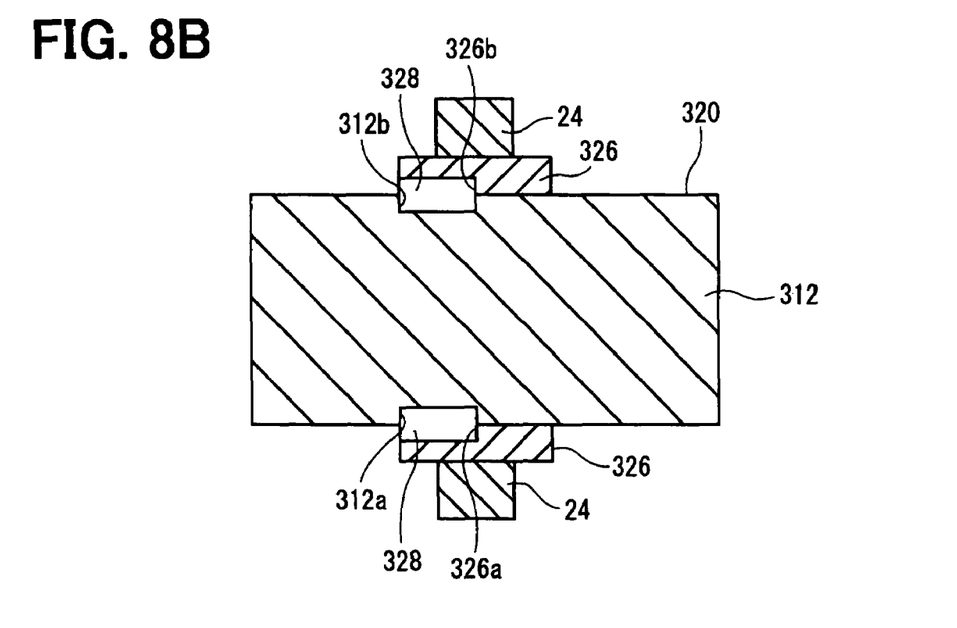
FIG. 8B is a longitudinal cross sectional view of the rotational angle sensing apparatus of FIG. 8A.

With reference to FIGS. 8A and 8B, each of the keys 328, 329 of the magnetic rotor 320 according to the third embodiment is substantially identical to the key 28 of the first embodiment. The key 328 is placed in a manner similar to that of the key 28 of the first embodiment. In contrast, the key 329 is placed in a manner similar to the key 228 of the second embodiment. That is, the key 328 and the key 329 are circumferentially displaced from each other by 180°. Here, although it is desirable to displace the keys 328, 329 from each other by 180°, it is not absolutely required to precisely set the displacement angle between the key 328 and the key 329 to 180°. In other words, the displacement angle between the key 328 and the key 329 may be set to 180° or thereabout (i.e., about 180°) to reduce the error rate of the measurement signal.

A rotatable shaft 312 has two key grooves 312a, 312a, which correspond to the two keys 328, 329, respectively. A collar 326 has two key grooves 326a, 326b, which correspond to the two keys 328, 329, respectively.

When the two keys 328, 329 are placed in good balance with respect to the rotatable shaft 312, the rotatable shaft 312 can be smoothly rotated. Also, when the two keys 328, 329 are respectively placed in the regions where the strength of the magnetic field is relatively low, it is possible to limit disturbances caused by the keys 328, 329 in the magnetic field generated around the magnetic rotor 320. Thus, even in the third embodiment, it is possible to reduce the measurement error of the rotational angle sensing apparatus like in the first and second embodiments.

Fourth Embodiment

In the above embodiments, the Hall IC 30 is placed axially outward of the axial end surface of the magnet 24. However, the Hall IC 30 can be placed any other suitable location as long as the Hall IC 30 can output the output signal, which corresponds to a change in the magnetic field caused by the rotation of the magnetic rotor 20.

Figure 9A:
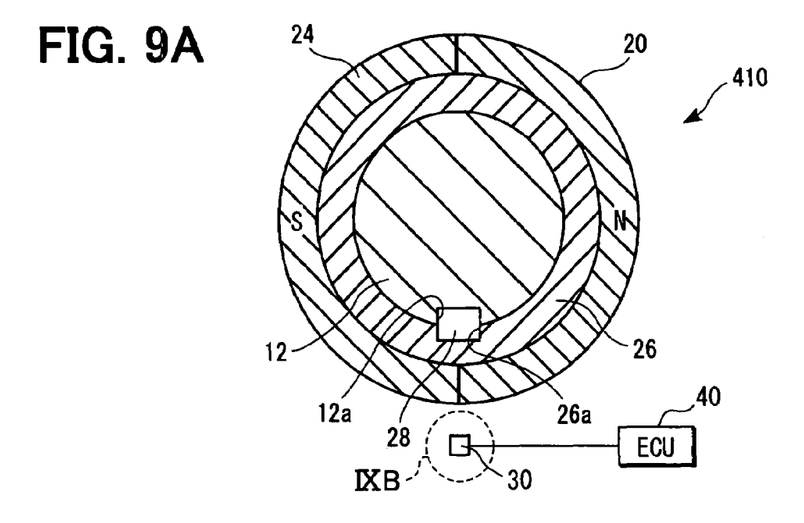
FIG. 9A is a lateral cross sectional view of a rotational angle sensing apparatus according to a fourth embodiment of the present invention.
Figure 9B:
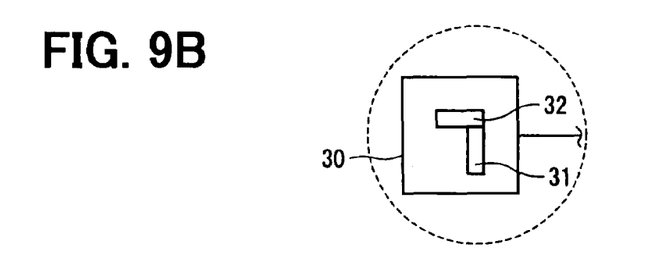
FIG. 9B is an enlarge view of an area IX in FIG. 9A.
Figure 9C:
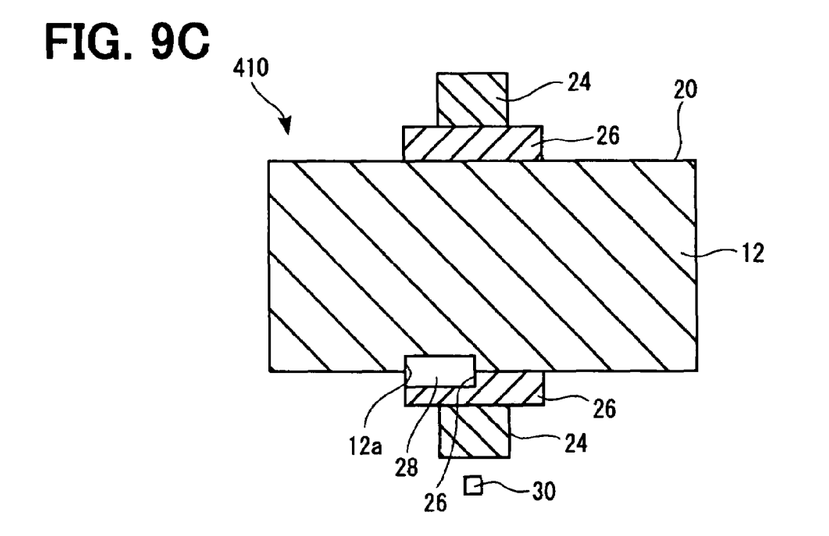
FIG. 9C is a longitudinal cross sectional view of the rotational angle sensing apparatus shown in FIG. 9A.

A rotational angle sensing apparatus 410 according to a fourth embodiment of the present invention shown in FIGS. 9A to 9C is substantially the same as the rotational angle sensing apparatus 10 of the first embodiment except the location of the Hall IC 30. The Hall IC 30 of the rotational angle sensing apparatus 410 is radially opposed to a radial end surface of the magnet 24 in such a manner that a predetermined distance is kept between the Hall IC 30 and the radial end surface of the magnet 24.

Figure 10A:
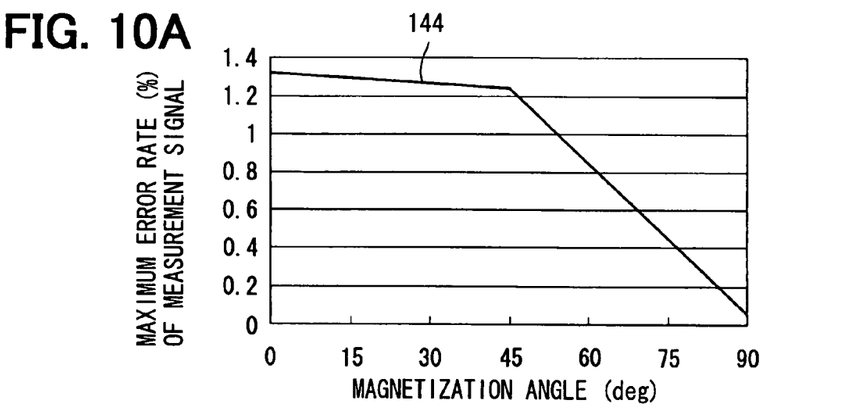
FIG. 10A is a schematic diagram showing a maximum error rate of the measurement signal of one of two Hall elements in view of a magnetization angle according to the fourth embodiment.
Figure 10B:
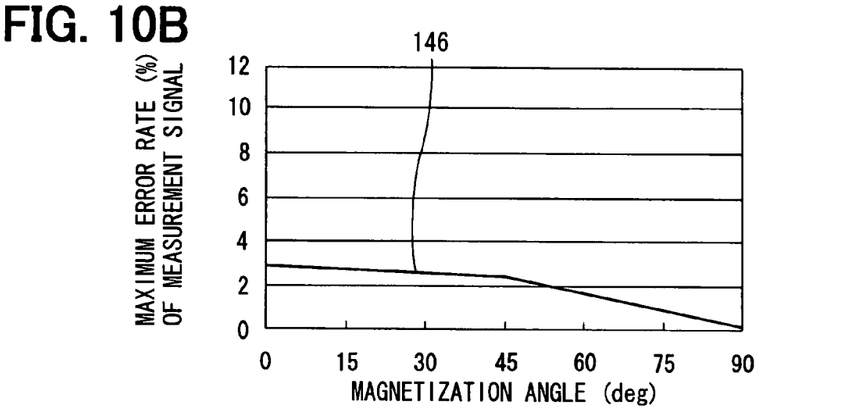
FIG. 10B is a schematic diagram showing a maximum error rate of the measurement signal of the other one of the two Hall elements in view of the magnetization angle according to the fourth embodiment.

FIGS. 10A and 10B show a relationship between the magnetization angle of the magnet 24 and a maximum error rate of the measurement signal in the case of the rotational angle sensing apparatus 410. Furthermore, FIG. 10A shows the maximum error rate 144 of the measurement signal of the Hall element 31, and FIG. 10B shows the maximum error rate 146 of the measurement single of the Hall element 32. As clearly shown in FIGS. 10A and 10B, similar to the first embodiment, the maximum error rate of the measurement signal becomes smaller when the magnetization angle changes from 0° toward 90°.

Even when the Hall IC 30 is placed at the above location, which is different from the location of the Hall IC 30 of the first embodiment, the magnetic rotor of any of the above embodiments can be advantageously used to reduce the measurement error of the rotational angle sensing apparatus.

Other Embodiments

In the above embodiments, the key(s), which is fitted into the groove(s) of the rotatable shaft and the groove(s) of the collar, is used as the positioner(s). However, the positioner(s) may be formed integrally in the outer peripheral wall surface of the rotatable shaft to fit with the groove(s), which is formed in the inner peripheral wall of the collar. Further alternatively, the positioner(s) may be formed integrally in the inner peripheral wall of the collar to fit with the groove(s), which is formed in the outer peripheral wall of the rotatable shaft.

Furthermore, in the above embodiments, the Hall IC 30, which has the two Hall elements 31, 32, is described. However, the number of the Hall elements 31, 32 is not limited to the above described one. Specifically, the rotational angle sensing apparatus may have three or more Hall elements, as magnetic sensing elements. Also, the magnetic sensing element(s) is not limited to the Hall element. For example, the magnetic sensing element(s) of the rotational angle sensing apparatus may be a magnetoresistive element.

Furthermore, in the above embodiments, the collar, which serves as the holder, is made of the non-magnetic material. Alternatively, the holder may be made of a magnetic material.

Additional advantages and modifications will readily occur to those skilled in the art. The invention in its broader terms is therefore not limited to the specific details, representative apparatus, and illustrative examples shown and described.

What is claimed is:

1. A magnetic rotor comprising:
   a holder, through which a rotatable shaft is received;
   a positioner that is made of a magnetic material and is fitted into at least one of an outer peripheral wall of the rotatable shaft and an inner peripheral wall of the holder to position the holder relative to the rotatable shaft in a circumferential direction; and
   an annular magnet that is fixed to the holder and surrounds the rotatable shaft, wherein:
   the annular magnet has two magnetic poles of different polarities, which are magnetized in a magnetization direction that coincides with a radial direction of the annular magnet; and
   the positioner is displaced around a rotational axis of the rotatable shaft from the magnetization direction of the annular magnet by about 90 degrees in the circumferential direction, wherein:
   the rotatable shaft has a groove in the outer peripheral wall of the rotatable shaft;
   the holder has a groove in the inner peripheral wall of the holder; and
   the positioner is fitted into the groove of the rotatable shaft and the groove of the holder.

2. The magnetic rotor according to claim 1, wherein the holder is made of a non-magnetic material.

3. The magnetic rotor according to claim 1, wherein the magnet is made of a composite material, which includes a magnetic material and a resin material, and is formed integrally with the holder through injection molding.

4. A rotational angle sensing apparatus comprising:
   the magnetic rotor of claim 1; and
   a plurality of magnetic sensing elements, which are spaced from the magnetic rotor and output measurement signals of different phases, respectively, in response to a change in a magnetic field of the magnet caused by rotation of the rotatable shaft.

5. A magnetic rotor comprising:
   a holder, through which a rotatable shaft is received;
   a positioner that is made of a magnetic material and is fitted into at least one of an outer peripheral wall of the rotatable shaft and an inner peripheral wall of the holder to position the holder relative to the rotatable shaft in a circumferential direction; and
   an annular magnet that is fixed to the holder and surrounds the rotatable shaft, wherein:

the annular magnet has two magnetic poles of different polarities, which are magnetized in a magnetization direction that coincides with a radial direction of the annular magnet; and the positioner is displaced around a rotational axis of the rotatable shaft from the magnetization direction of the annular magnet by about 90 degrees in the circumferential direction, wherein:

the positioner is a first positioner;

the magnetic rotor further comprises a second positioner that is made of a magnetic material and is fitted into at least one of the outer peripheral wall of the rotatable shaft and the inner peripheral wall of the holder to position the holder relative to the rotatable shaft in the circumferential direction; and the first positioner and the second positioner are displaced from each other around the rotational axis of the rotatable shaft by about 180 degrees in the circumferential direction.

6. The magnetic rotor according to claim 5, wherein the holder is made of a non-magnetic material.

7. The magnetic rotor according to claim 5, wherein the magnet is made of a composite material, which includes a magnetic material and a resin material, and is formed integrally with the holder through injection molding.

8. A rotational angle sensing apparatus comprising:

the magnetic rotor of claim 5; and a plurality of magnetic sensing elements, which are spaced from the magnetic rotor and output measurement signals of different phases, respectively, in response to a change in a magnetic field of the magnet caused by rotation of the rotatable shaft.

* * * * *